(12) United States Patent
Atzmony et al.

(10) Patent No.: US 7,945,776 B1
(45) Date of Patent: May 17, 2011

(54) SECURING A PASSPHRASE

(75) Inventors: Yedidia Atzmony, Omen (IL); Arnold E. Adelman, Berlin, MA (US); Adel M. Hanna, North Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 989 days.

(21) Appl. No.: 11/529,919

(22) Filed: Sep. 29, 2006

(51) Int. Cl.
*H04L 29/06* (2006.01)

(52) U.S. Cl. ........ 713/165; 713/164; 713/183; 713/184; 713/185

(58) Field of Classification Search .......... 713/164–165, 713/183–185; 726/17–19
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,332,192 B1 * | 12/2001 | Boroditsky et al. | 713/168 |
| 6,370,649 B1 * | 4/2002 | Angelo et al. | 726/18 |
| 7,058,180 B2 * | 6/2006 | Ferchichi et al. | 380/247 |
| 2004/0158714 A1 * | 8/2004 | Peyravian et al. | 713/171 |
| 2005/0086510 A1 * | 4/2005 | Nicodemus et al. | 713/200 |
| 2005/0154924 A1 * | 7/2005 | Scheidt et al. | 713/202 |
| 2005/0286746 A1 * | 12/2005 | Silvester | 382/116 |
| 2006/0010324 A1 * | 1/2006 | Appenzeller et al. | 713/171 |
| 2006/0036871 A1 * | 2/2006 | Champine et al. | 713/183 |
| 2006/0059363 A1 * | 3/2006 | Mese et al. | 713/185 |
| 2007/0234062 A1 * | 10/2007 | Friedline | 713/183 |

OTHER PUBLICATIONS

Tung, Brian, *Kerberos: Where Did It Come From, and Why?*, Copyright 2002, http://www.isi.edu/~brian/security/why_kerberos.html (8 pp).
U.S. Appl. No. 11/394,536, Yedidia Atzmony, et al.

* cited by examiner

*Primary Examiner* — Vivek Srivastava
*Assistant Examiner* — Hee Song
(74) *Attorney, Agent, or Firm* — Muirhead and Saturnelli, LLC

(57) ABSTRACT

Access to a target system is secured by use of an encrypted passphrase that is supplied on-site at the target system by a user requesting access. The encrypted passphrase includes an access credential portion and a one-way encoded portion. The one-way encoded portion is an encoded version of at least some of the access credential portion. A validator at the target system receives and decrypts the encrypted passphrase and identifies the access credential portion and one-way encoded portion. The validator one-way encodes the identified access credential portion and compares the result to the identified one-way encoded portion from the decrypted passphrase. If the results do not match, the validator denies access to the user requesting access. The encoding and decrypting of the passphrase may be performed using keys generated from a secret key/seed related to the target system, unencrypted information such as time/date information, and a user PIN.

28 Claims, 9 Drawing Sheets

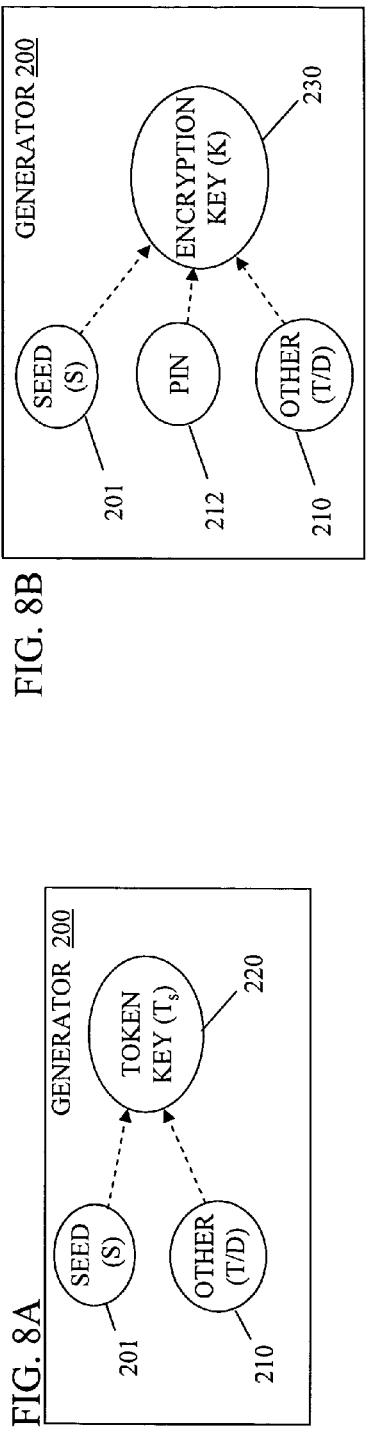
FIG. 8B
FIG. 8A
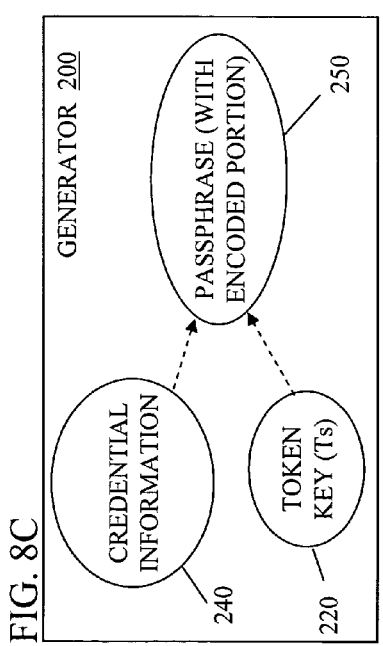
FIG. 8C
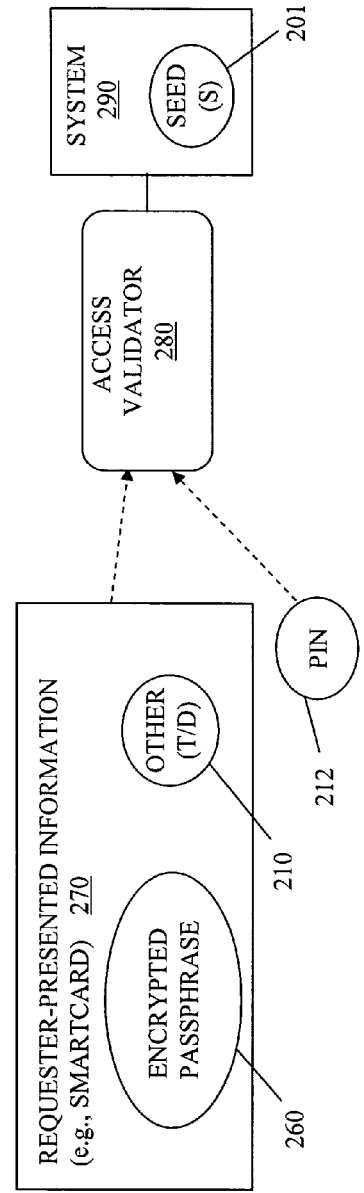
FIG. 8D
FIG. 8E

SECURING A PASSPHRASE

TECHNICAL FIELD

This application relates to the field of computer storage devices and, more particularly, to the field of selectively providing and securing access to computer storage devices.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some cases, it may be necessary to provide access to a computer storage device for maintenance and/or reconfiguration of the computer storage device. However, since the type of access needed to be able to perform maintenance and/or reconfiguration is the same type of access that would allow a malicious user to damage the computer storage device and/or eliminate or corrupt data stored thereon, it is useful to be able to restrict the particular users that have the type of access needed to perform maintenance and/or reconfiguration of the computer storage device. One way to do this is to password protect the computer storage device and provide the password only to those users that are allowed to perform maintenance and/or reconfiguration on the computer storage device. However, at some point, it may become desirable to revoke access for at least some of the users that were previously given access. For example, a user that works for a company that maintains the storage device may leave that company. In addition, authorized users may inadvertently (or otherwise) divulge a password to a malicious user who may then use the password to gain access and damage the storage device and/or destroy or corrupt the data. Also, in some instances, administrators may share an administrator account.

One way to address this difficulty is to connect (e.g., via a communications cable, the Internet, etc.) each of the storage devices to a central security device that manages security/access for all of the storage devices and that reconfigures and revokes users' passwords that allow access to the storage devices. The central security device may provide a mechanism for on-line account management where each user has an individual account and private password. The on-line account management may be used for employment control to disable an account of one who is no longer employed. In instances where it is desirable to revoke a user's access or in instances where an authorized user has divulged a password, the central security device, coupled to the storage device, may change/revoke the affected password and then notify authorized users of the change. However, such a central security device may be impractical for a number of reasons, not the least of which is the fact that it may be difficult to connect all storage devices to the central security device.

Furthermore, for some encryption techniques, it may be possible for a malicious user to determine a decryption key given a large enough sampling of encrypted values and the corresponding clear text values. Thus, even in cases where a user performing maintenance is given encrypted values that allow access to the storage device without giving the user a decryption key, anyone with knowledge of the encrypted values and the corresponding clear text values, including the user, may be able to eventually ascertain the encryption key and breach the security of the system.

Accordingly, it is desirable to address the security issues that arise when passwords for accessing security devices need to be changed/revoked without having to provide remote connections to the storage devices and to further enhance security of the system.

SUMMARY OF THE INVENTION

According to the present system, a method of restricting access to a target system includes receiving an encrypted passphrase. A decrypted passphrase is generated using an encryption key to decrypt the encrypted passphrase. A first portion of the decrypted passphrase is one-way encoded to provide a one-way encoded portion. The one-way encoded portion is compared with a second portion of the decrypted passphrase. Access is denied into the target system if the one-way encoded portion does not match the second portion of the decrypted passphrase. If the result and the second portion of the decrypted passphrase match, a validity of the first portion may be determined, wherein if the first portion is valid, access is allowed into the target system and if first portion is not valid, access is denied into the target system. A secret key may be obtained that is associated with the target system and used in generating the encryption key and in generating a token key that is used for one-way encoding. A user PIN and unencrypted information, including time/date information associated with the passphrase, may be received and used in generation of the token key and the encryption key. The secret key may be included in the target system in tamper-proof hardware. The first portion may include at least one of: a username that identifies a user, a validity duration for which access is allowed, a role for the user and an activity of the user. The user may input the encrypted passphrase manually or via a storage medium. Further, a computer readable medium may include computer executable instructions for performing the above steps and a device may include a processor for performing the above steps.

According further to the present system, a system for controlling access to a target system includes a generator and a validator. The generator obtains access credentials for a user, one-way encodes at least a first portion of the access credentials, and generates an encrypted passphrase by encrypting at least a second portion of the access credentials and the one-way encoded portion. The validator decrypts the encrypted passphrase, one-way encodes the first portion of the access credentials to generate a result, compares the result to the one-way encoded portion, and denies access to the target system if the result does not match the one-way encoded portion. If the result and the one-way encoded portion of the decrypted passphrase match, a validity of the access credential portion may be determined, wherein if the access credential portion is valid, access is allowed into the target system and if the access credential portion is not valid, access is denied into the target system. The system may one-way encode with a token key that is generated using a secret key associated with the target system.

According further to the present system, a method of restricting access to a target system includes providing a secret key associated with the target system. An encryption key is generated using the secret key. A token key is generated using the secret key. An encrypted passphrase is received, wherein the encrypted passphrase includes an access credential portion and a one-way encoded portion, the one-way encoded portion being a version of at least some of the access credential portion encoded using the token key. The encryption key is used to decrypt the encrypted passphrase to generate a decrypted passphrase. A first portion of the decrypted passphrase is one-way encoded to generate a result. The result is compared to a second portion of the decrypted passphrase. Access into the target system is denied if the result does not match the second portion of the decrypted passphrase. If the result matches the second portion of the decrypted passphrase, a validity of the first portion is determined, wherein if the first portion is valid, access into the target system is allowed and if the first portion is not valid, access into the target system is denied. The encoding and decrypting of the passphrase may be provided using at least one of: a secret key related to the target system, unencrypted information supplied with the encrypted passphrase, and a user PIN.

BRIEF DESCRIPTION OF DRAWINGS

Embodiments of the system are described with reference to the several figures of the drawings, in which:

FIGS. 8A-8E are schematic diagrams illustrating components used in controlling access to a target system according to the system described herein.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be exaggerated or altered to facilitate an understanding of the system.

Figure 1:
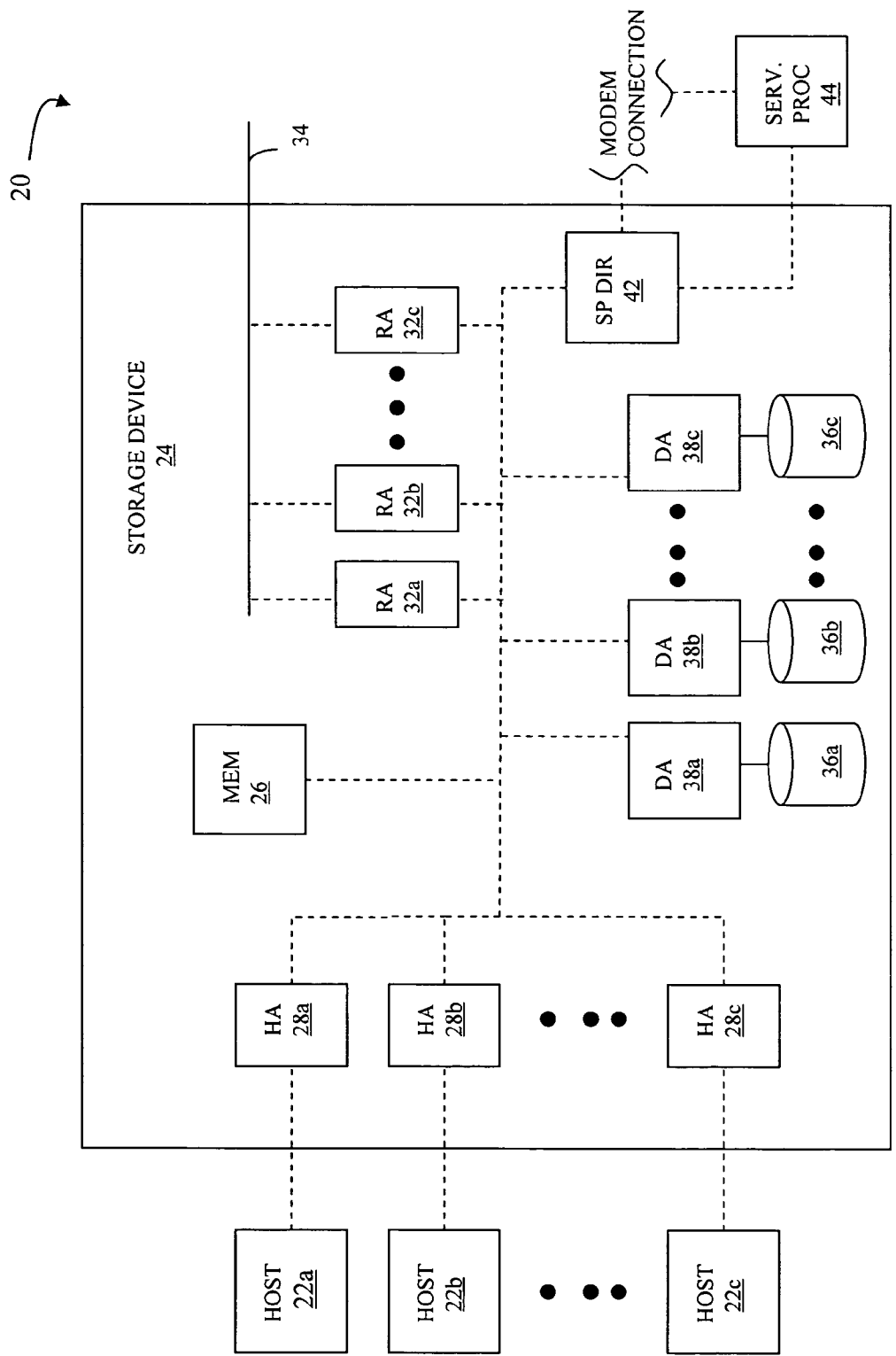
FIG. 1 is a schematic diagram showing a plurality of hosts coupled to a data storage device with a service processor used in connection with the system described herein.

In FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may also include a service processor director 42 that communicates with and controls components of the storage device 24 to modify the configuration thereof. For example, the service processor director 42 may be used to configure local and remote data mirroring, may provide access to various system functions such as disk erasing, and, generally, may provide relatively thorough and complete access to the storage device 24 and components thereof to facilitate maintenance, configuration, etc.

The service processor director 42 may be provided with a modem connection that allows remote access to the storage device 24 through the service processor director 42. Using the modem connection, it may be possible for a remote technician to perform maintenance, reconfiguration, etc. to the storage device 24. In an embodiment herein, the modem connection into the service processor 42 is restricted to the manufacture of the storage device 24. Of course, other access rules are possible so that, for example, it is possible to provide access through the modem connection to a plurality of trusted users.

The service processor director 42 may be coupled to a service processor 44 that interfaces with the service processor director 42 to provide access to allow maintenance, reconfiguration, etc. of the storage device 24. In an embodiment herein, the service processor 44 may be implemented using a conventional laptop computer running the Windows® operating system. The service processor 44 may be coupled to the service processor director 42 in any appropriate fashion, such as by conventional data communication means. In some embodiments, a secure, tamper-proof, connection may be used between service processor 44 and the service processor director 42. The service processor 44 may be built into the storage device 24 so that access to the service processor 44 may require access to the storage device 24 (e.g., via a locked cabinet). In some embodiments, the modem connection may be provided through the service processor 44 rather than through the service processor director 42.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figures 2, 3:
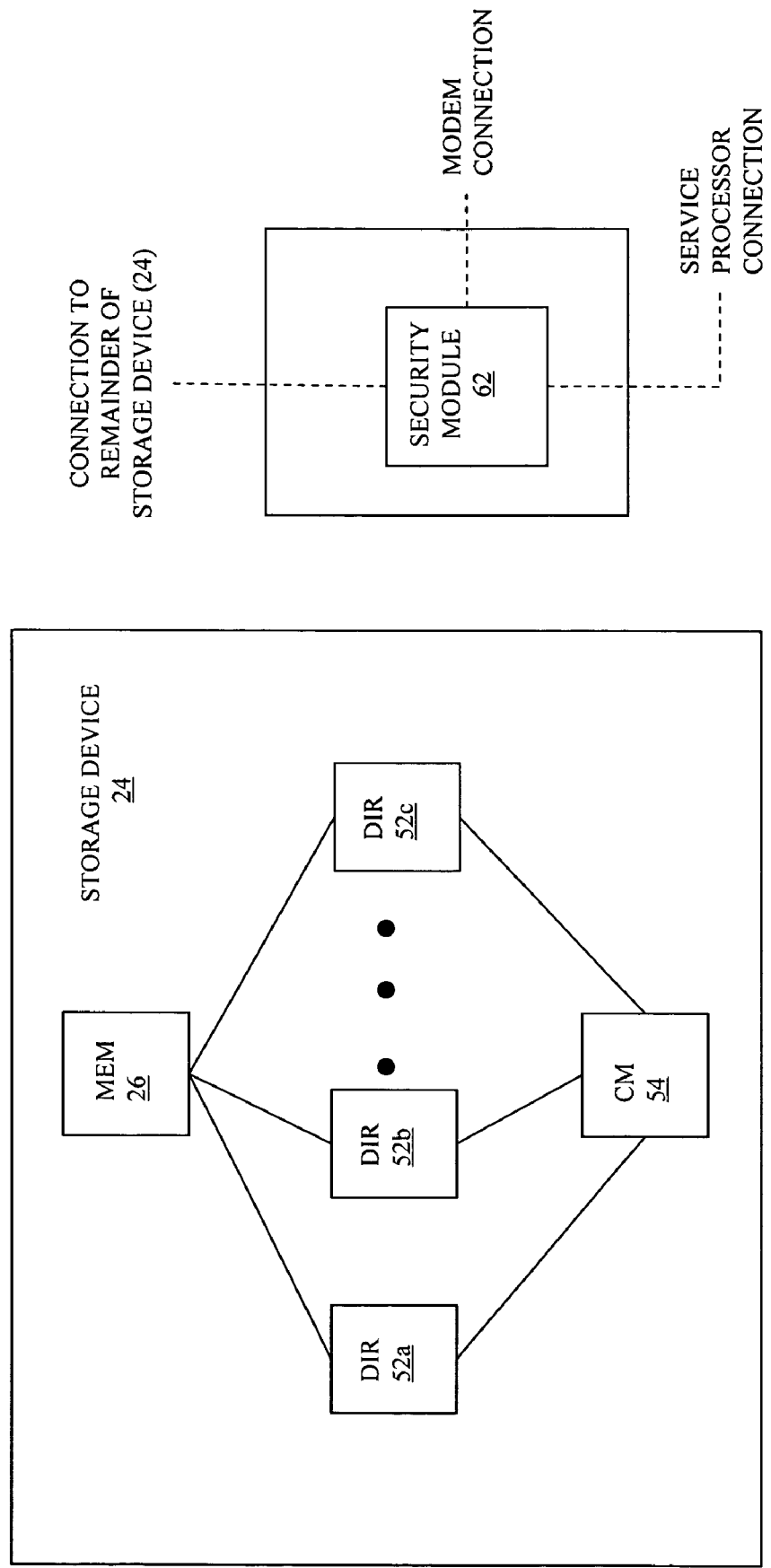
FIG. 2 is a schematic diagram showing a storage device, memory, a plurality of directors, and a communication module according to the system described herein.
FIG. 3 is a diagram illustrating a security module that is provided as part of a service processor director according to the system described herein.

Referring to FIG. 2, a storage device 24 is shown having a plurality of directors 52a-52c coupled to the memory 26. Each of the directors 52a-52c represents one of the HA's 28a-28c, RA's 32a-32c, DA's 38a-38c, or the service processor director 42. In an embodiment disclosed herein, there may be up to sixty-four directors coupled to the memory 26. Of course, for other embodiments, there may be a higher or lower maximum number of directors that may be used.

The storage device 24 includes an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

Referring to FIG. 3, the service processor director 42 is shown in more detail as including a security module 62. Of course, the service processor director 42 may contain other components besides the security module 62 that provide functionality other than security. However, the focus of the discussion herein is the security module 62 and thus other components of the service processor director 42 are not shown. The security module 62 restricts access to the storage device 24 for connections coming through the modem connection and/or the connection for the service processor 44. Therefore, all maintenance, reconfiguration, etc. commands as well as system inquiries that are made through either the modem connection or the service processor connection to the service processor director 42 pass through and are vetted by the security module 62.

In an embodiment herein, the security module 62 may be implemented using a processor and appropriate software. However, it will be appreciated by one of ordinary skill in the art that the functionality described elsewhere herein for the security module 62 may be implemented using any appropriate combination of computer software and/or hardware. Note also that the security module 62 does not necessarily need to be implemented within the service processor director 42 and may, instead, be implemented at any appropriate access point for the storage device 24, such as the service process 44. Of course, if the security module 62 is implemented at a user access point that is not also an access point for the modem connection, then separate security provisions may need to be made for the modem connection or, alternatively, the modem connection may be made through the service processor 44. Note also that the security module 62 may be implemented using or in conjunction with an operating system security system, such as built in security features of the Windows® operating system. In some embodiments, a username that is encoded into a passphrase (discussed elsewhere herein) is the same username that the user uses to log in to the computer operating system.

Note that a user may also be provided with other access credential information, for example, a particular role that controls the type and extent of access to the storage device 24 provided to the user. In some instances, it may be desirable to provide a user with limited access while in others a user may need to be given extensive access in order to be able to perform the task(s) for which the user was given access. The role may be encoded into the passphrase so that, when the user presents the passphrase, the role for that user in connection with accessing the storage device is also defined. It should be understood that reference herein to username also may also include, where appropriate, other access credentials of the user and an optional role for the user.

Figure 4:
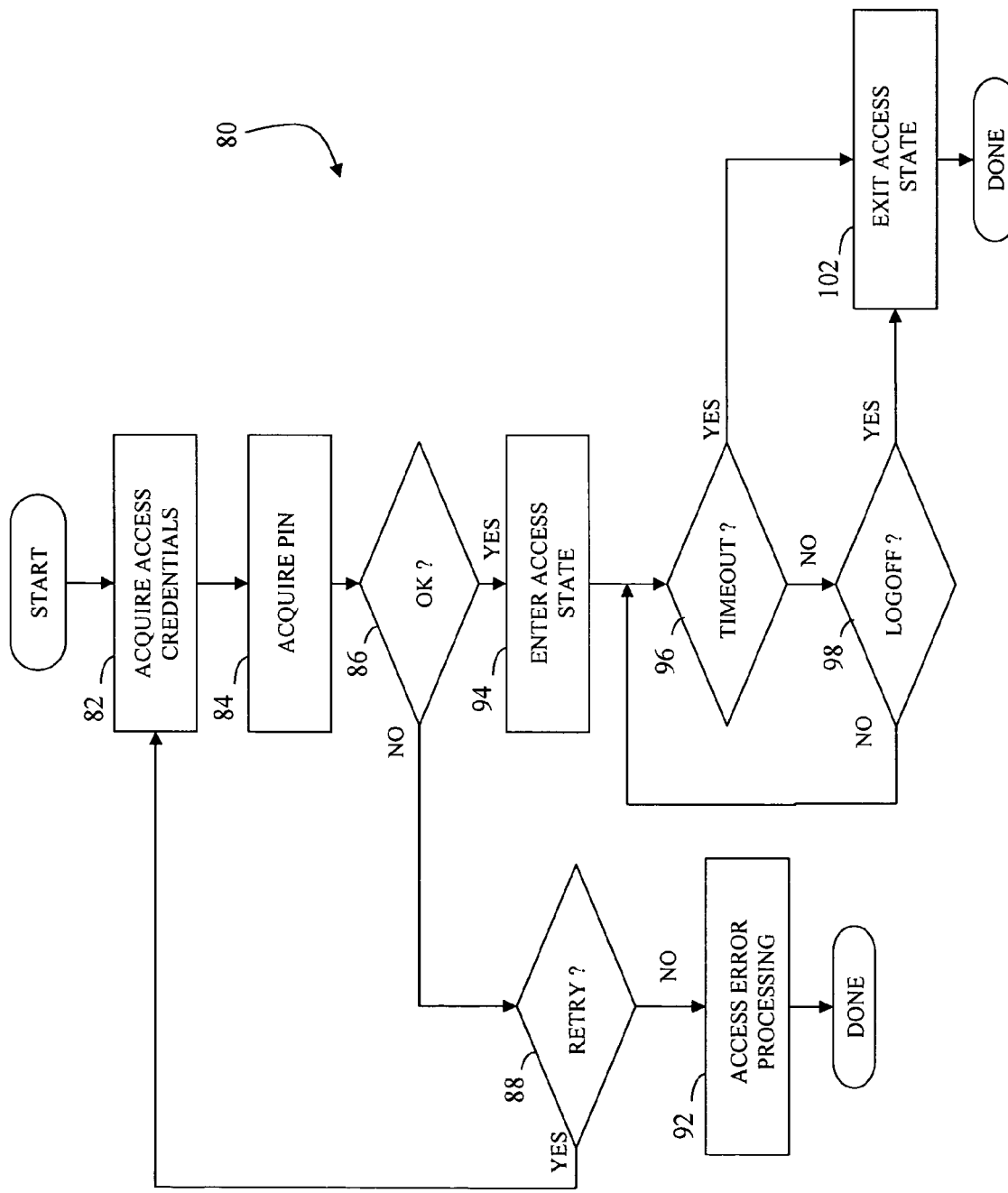
FIG. 4 is a flowchart illustrating processing performed by a security module in connection with determining whether to grant a user access to a storage device according to the system described herein.

Referring to FIG. 4, a flow chart 80 illustrates steps performed by the security module 62 in connection with granting and revoking access to the storage device 24 according to an embodiment of the system described herein. Processing begins at a first step 82 where a user is prompted for access credentials. In an embodiment herein, the access credentials may include a user passphrase and a username that identifies the user. The passphrase and/or username may be entered manually by the user (e.g., typed by the user at the service processor 44) or provided to the security module 62 by some other means, such as a floppy disk, a CD, a smart card, a memory stick, or other storage medium. The username allows the security module 62 to grant access to only the user identified by the username. In an embodiment herein, the username may be encoded into the passphrase, as discussed in more detail elsewhere herein.

Following the step 82 is a step 84 where a user is prompted for a personal identification number (PIN). In an embodiment herein, the PIN is also encoded into the passphrase and is used as a check to protect against the possibility of an unauthorized user obtaining the passphrase and username and gaining unauthorized access to the storage device 24. In another embodiment, the PIN is incorporated as part of the encryption key, as further described elsewhere herein. In any case, a user can not gain access to the storage device 24 without also having the proper PIN value.

The PIN protects against unauthorized access since an unauthorized user who obtains the username and passphrase may not also obtain the PIN, which may be known only by the authorized user (and perhaps the entity that issued the passphrase). The combination of the passphrase and the PIN may be deemed a two-factored password since it encompasses both what the user has (the passphrase) and what the user knows (the PIN). In some embodiments, the PIN may be expanded to include any alpha-numeric characters rather than just numbers. Accordingly, for the discussion herein, the term "PIN" should be understood to include any appropriate characters and not just numbers. Note also that the passphrase and PIN combination may also bind a user to any actions taken when the passphrase and PIN combination are used, thereby providing accountability and non-repudiation.

Following the step 84 is a test stepped 86 where the security module 62 determines if the passphrase, username, and PIN entered at the steps 82, 84 are acceptable for granting the user identified by the username access to the storage device 24. The processing performed at the step 86 is discussed in more detail elsewhere herein. If it is determined at the test step 86 that the user should not be granted access, then control transfers from the test step 86 to a test step 88 which determines if the user should be allowed a retry. In some cases, the system may allow the user a certain number of retries (e.g. three) to account for the possibility that the user incorrectly typed his PIN or somehow other information like the username and/or the passphrase was entered incorrectly. The number of retries and whether to grant any retries at all is based on whatever security policy adopted for the system.

If it is determined that the test step 88 that the user is to be allowed a retry, then control transfers from the test step 88 back to the step 82 to reprompt the user for access credentials. Otherwise, if it is determined at the test step 88 that the user is not to be allowed a retry, then control transfers from the test step 88 to a step 92 where access error processing is performed. The processing performed at the step 92 depends upon the policies adopted for the system and may include, for example, displaying a message to the user and requiring that a certain amount of time pass before the user can attempt to access the system again. Of course, any other type of access error processing may be performed at the step 92 consistent with the policy adopted for the system, if any. Following the step 92, processing is complete.

If it is determined at the test step 86 that the access credentials and PIN provided at the steps 82, 84 are acceptable, then control transfers from the test step 86 to a step 94 where the system enters an access grant state for the user. While the system is in the access grant state, the user is allowed to access the storage device 24 through the service processor director 42 (or through whatever access point is provided for the security module 62). In some embodiments, after the system enters the access state at step 94, the user may be required to separately log in to the system and then the log into any application the user wishes to use. In these embodiments, entering the access state at the step 94 may be a precursor to allowing a user to log into the system. In other embodiments, entering the access state at the step 94 is part of the log on process so that the user does not need to separately log in to both the system and the application after entering the access state at the step 94.

Following the step 94 is a test step 96 which determines if the system has timed out. In an embodiment herein, the system may time out if a certain amount of idle time has passed after the user has entered the access state at the step 94. Providing for a time out prevents a situation where an authorized user accesses the storage device 24 and subsequently forgets to log out, thus providing an opportunity for unauthorized users to access storage device 24. In an embodiment herein, the system may time out after fifteen minutes have passed with no user keyboard input at the service processor 44, but of course other timeout values may be used.

In an embodiment herein, another type of timeout may also occur at the step 96. The other type of timeout involves part of the passphrase that may include information indicating the allowed service time (allowed access time) for the user. That is, the passphrase may indicate that the user is only allowed access to the storage device 24 between a first time and a second time. For example, the user may be allowed access to the storage device 24 for only a twenty-four or a forty-eight hour period starting on a particular date. Once this time period has passed, the user may no longer be allowed access to the storage device 24 even though the user otherwise has valid credentials and a valid PIN. Accordingly, for embodiments where the passphrase includes a time limit for the time which the user is allowed access to the storage device 24, the test at the step 96 may represent a determination of whether the time for which the user is allowed access has passed.

In some embodiments, the other type of time out described above is not used so that, once the user logs into the system and remains active, the user is not exited from the access state. Of course, as discussed elsewhere herein, even if the other type of time out is not used once the user logs in to the system, it is still possible to use time criteria to determine whether to grant access to the user in the first place.

If it is determined at the test step 96 that a timeout has not occurred, then control transfers from the test step 96 to a test step 98 which determines if the user has logged off of the system. If not, then control transfers back to the test step 96 to determine if a timeout has occurred. Thus, while a user is accessing the system, the system is continuously determining if the user has either timed out or if the user has logged off.

If it is determined at the test step 96 that a timeout has occurred or if it is determined at the test step 98 that the user has logged off, then control transfers from either the step 96 or the step 98 to a step 102 where the system exits the access state. Once the system has exited the access state at the step 102, the user may no longer have access to the storage device 24. In some embodiments, the user may be allowed to reestablish access while in other embodiments the user may not. In embodiments where the access state is tied to the user logging in to or out of the system, exiting the access state at the step 102 may represent the user logging out of some part of the system (e.g., logging out of the operating system). Following the step 102, processing is complete.

Figure 5:
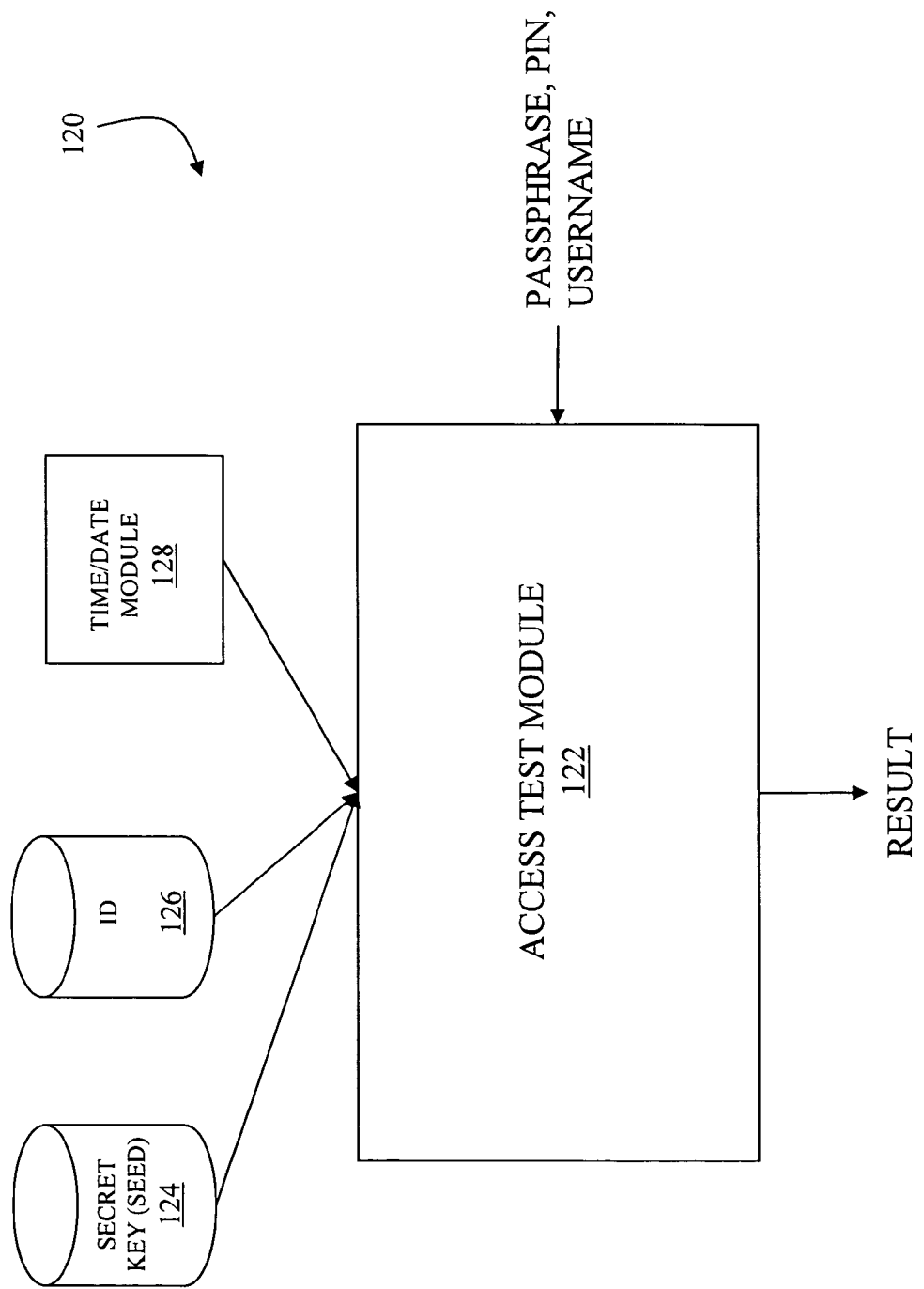
FIG. 5 is a diagram illustrating components of a security module according to the system described herein.

Referring to FIG. 5, a diagram 120 illustrates components of the security module 62 that may be used to perform the test at the step 86 to determine if a user should be granted access. An access test module 122 receives the passphrase, username (and possibly user role), and PIN along with other information to generate a result indicating whether a particular user corresponding to the username should be granted access. The access test module 122 also receives a secret or seed key 124, a storage device ID 126 and the time and date from a time and date module 128.

The secret key 124 may be stored within the storage device 24 in a way that does not allow access to the secret key 124 except by the service processor director 42 (or whichever device is hosting the security module 62) and/or other authorized devices/users. It is not expected that a user presenting a passphrase would have direct access to the secret key. In an embodiment herein, the secret key 124 may be stored using tamper-proof hardware located within the storage device 24. In some embodiments, each of the different storage devices provided by a manufacturer may have a unique secret key. In other embodiments, all of the storage devices from a manufacture may have the same secret key. In still other embodiments, groups of storage devices have the same secret key while other storage devices have a different secret key. The distribution of secret keys is a security policy decision. The more storage devices that share the same secret key, the easier it is to administer the system. However, providing different storage devices with different secret keys increases the level of security provided by the system. As discussed elsewhere herein, the secret key 124 is also known by an entity that generates the passphrase for the user which, in an embodiment herein, may be the manufacture of the storage device 24 or some other entity that manages maintenance/reconfiguration of the storage device 24.

The identifier 126 may be used to uniquely identify the storage device 24 to prevent a user who is authorized to access only a particular storage device from (inadvertently or otherwise) accessing other storage devices. In some embodiments, each storage device may be provided with a unique identifier. In other embodiments, groups of storage devices may share an identifier so that, for example, a plurality of storage devices at a single site may have the same identifier. In an embodiment herein, the identifier 126 is also the serial number of the storage device 24 issued by the manufacturer of the storage device 24.

The time and date module 128 may be used to obtain the current time and date and provide that information to the access test module 122. In an embodiment herein, the time and date module 128 accesses one of a plurality of well-known Web sites to obtain time information. Obviously, the time and date module 128 may obtain time information from any source, including an internal clock of the storage device 24. However, to the extent that the accuracy of the information from the time and date module 128 can be ensured, the system is more secure since ensuring the time and date information prevents an unauthorized user from modifying the system time and date information for the storage device 24 in an attempt to use an "old" passphrase. There are a number of well-known mechanisms that may be employed to help ensure that the time and information from the time and date module 124 are accurate.

Figure 6:
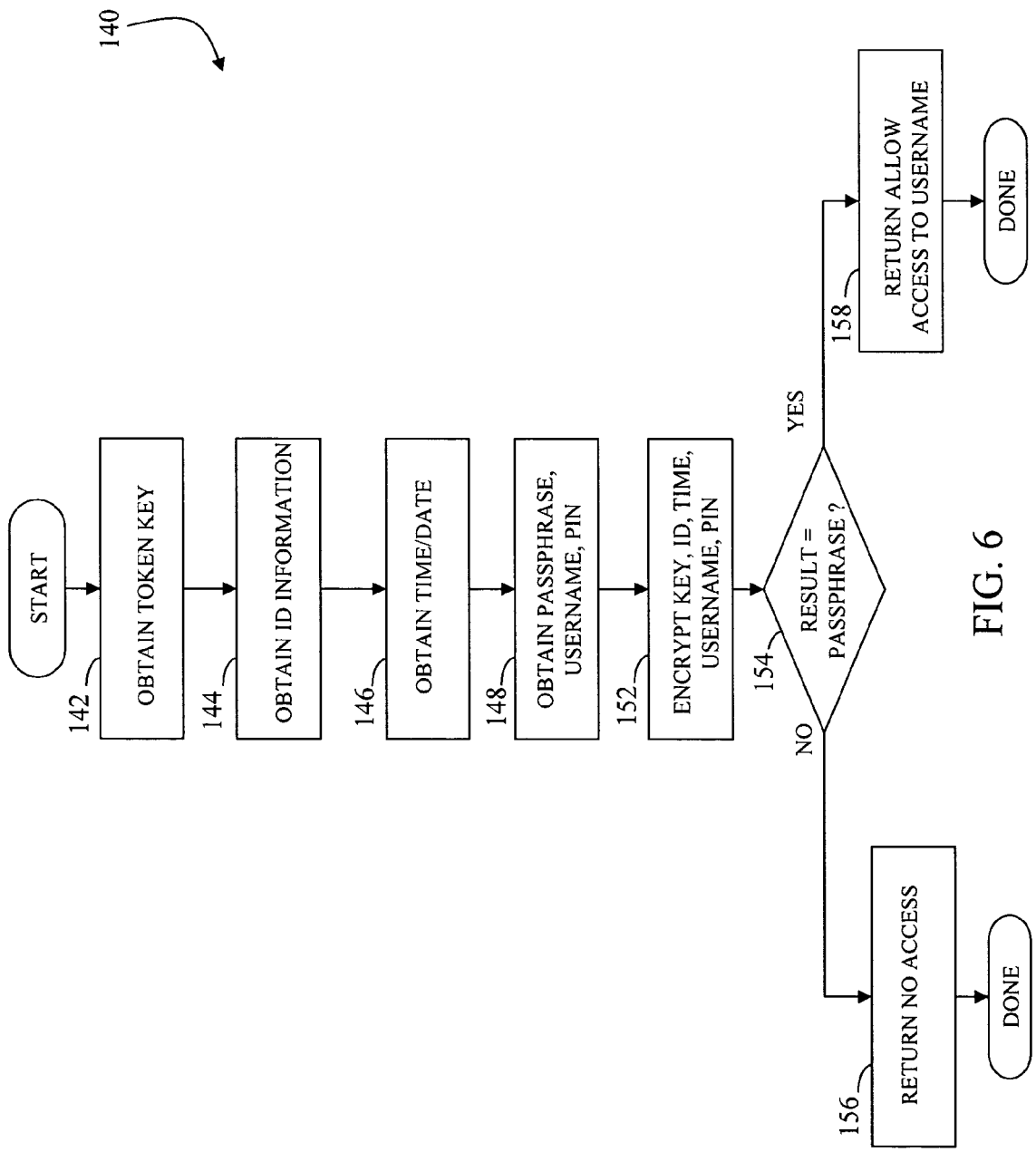
FIG. 6 is a flowchart illustrating steps performed in connection with determining whether a user has provided an appropriate passphrase for gaining access to a storage device according to the system described herein.

Referring to FIG. 6, a flowchart 140 illustrates steps performed by the access test module 122 in order to determine whether to grant access to a user according to an embodiment of the system described herein Processing begins a first step 142 where the access test module 122 obtains the secret key associated with the storage device 24. As discussed elsewhere herein, the secret key associated with the storage device 24 may be stored in tamper-proof hardware provided within the storage device 24. Following the step 142 is a step 144 where the access test module 122 obtains the ID of the storage device 24. Following the step 144 is a step 146 where the access test module 122 obtains the current date and time from the date and time module 128. As discussed elsewhere herein, improving the reliability of the date and time improves the security of the system.

Following the step 146 is a step 148 where the access test module 122 obtains the passphrase, username (and possibly role), and PIN. In an embodiment herein, the user may present a storage medium such as a smart card or memory that contains the passphrase and (possibly the role) and may manually type in the username and PIN into the service processor 44 or other appropriate device. In other embodiments, the user may manually type in the passphrase and/or the username instead of, or in addition to, providing that information using a storage medium. In other embodiments, the user may type in only the PIN.

Following the step 148 is a step 152 where a one-way encryption is performed using the secret key, the ID, the date and time, the username (and possibly role), and the PIN. In an embodiment herein, the one-way encryption performed at the step 152 is a one-way mathematical function that generates a deterministic output value from a particular set of input values such that it is mathematically difficult, if not impossible, to ascertain the input values given only the output value. Thus, an unauthorized user who obtains a passphrase may not use it to ascertain the secret key or any other information encoded into the passphrase. In other embodiments, two-way encryption may be used where the decryption key (or similar) is not divulged. Note also that, in other embodiments, the PIN is not necessarily part of what is encrypted at the step 152, although in such cases the PIN may be used in connection with the encryption operation (e.g., as a key or part of a key). Note also that, in some embodiments, the PIN may be initially transformed using a hash (or similar) and the result thereof may be used rather than the PIN itself.

There are a significant number of types of one-way encryption functions that may be used, including encryption of the ID, the date and time, the username (and possibly role), and the PIN using the secret key, encryption of the ID, the date and time, the username (and possibly role), the PIN and the secret key, certain types of one-way hash functions, digital signatures, etc. The system described herein does not depend upon any specific type of one-way encryption function being used, so long as the one-way encryption 1) allows verification that the entity that constructed the passphrase is in possession of the secret key and 2) the secret key cannot be ascertained (or at least practically ascertained) from the passphrase. Note that, for the system provided herein, the user is not given the secret key except as it is encrypted in or used to encrypt the passphrase.

Following the step 152 is a test step 154 which determines if the result of the one-way encryption performed at the step 152 equals the passphrase. If not, then control transfers to the step 156 where the access test module returns an indicator indicating that no access is to be provided to the user. Following step 156, processing is complete. On the other hand, if it is determined at the test step 154 that the result of the hash performed at the step 152 equals the passphrase, then control transfers from the test step 154 to a step 158 where the access test module 122 returns an indicator indicating that the user corresponding to the username provided at the step 148 is allowed access to the storage device 24. If a role is used, then the indicator provided at the step 148 also indicates the role for the user. Following the step 158, processing is complete.

In an embodiment herein, the system may round the time and date value obtained at the step 146 to the nearest day. Similarly, the passphrase may be encoded with a time and date value rounded to the nearest day. In this way, it is possible to have the time value obtained at the step 146 be equal to the time value encoded into the passphrase. Of course, different rounding may be used so that, for example, time values may be rounded to the nearest week, the nearest two-day period, etc. In addition, it is possible to encode the passphrase with the expected time of service (rather than the current time) so that, when the user presents the passphrase to the storage device 24, the time encoded in the passphrase can match the time of service. Note also that the time obtained at the step 146 may be used in connection with the test for a timeout at the step 96 discussed above in connection with the flowchart 80 of FIG. 4 to determine if the allowed time of access has passed. Following the step 158, processing is complete.

Figure 7:
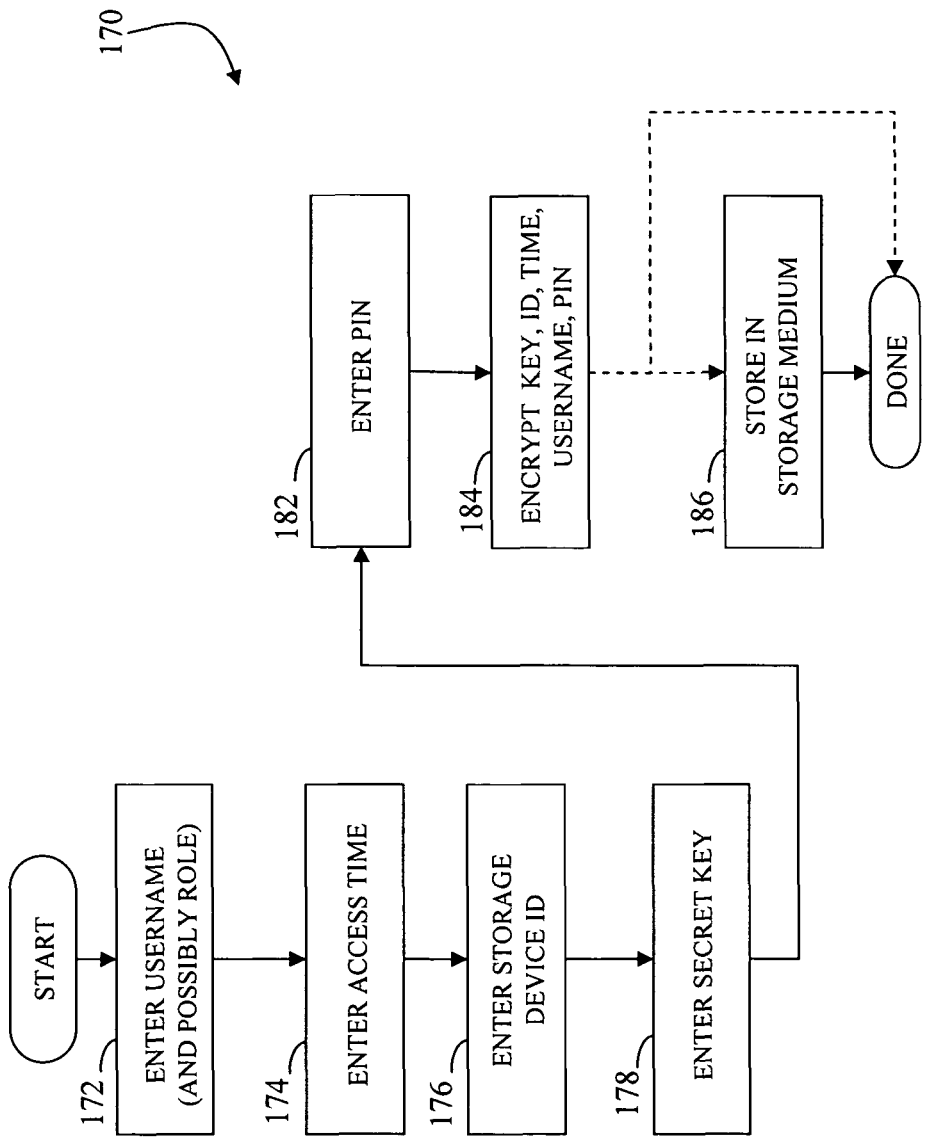
FIG. 7 is a flowchart illustrating steps performed in connection with generating a passphrase for a user to gain access to a storage device according to the system described herein.

Referring to FIG. 7, a flowchart 170 illustrates steps performed in connection with generating a passphrase for a user to access the storage device 24 according to the system described herein. In an embodiment herein, the passphrase may be generated by the manufacture of the storage device 24 and provided to users on an as needed basis. It is also possible to have an entity other than the manufacture be responsible for maintenance/reconfiguration of the storage device 24 and thus be responsible for generating passphrases. In embodiments where the time value is included in the passphrase, then users are given a passphrase that has encoded therein an allowed time for the users to access to the storage device 24.

Processing begins at a first step 172 where the username is entered. Entering the username at the step 172 may be performed by any appropriate means, including having the user type and his or her username or by accessing a database of authorized users that contains the username. If roles are employed, then the role for the user may also be entered at the step 172. Following the step 172 is a step 174 when the expected access time of the storage device 24 is entered. As discussed elsewhere herein, the expected access time may be encoded into the passphrase so that the passphrase allows access to the storage device 24 only for the specified time rather than at any time. Following the step 174 is a step 176 where the ID of the storage device 24 is entered. Following the step 176 is a step 178 where the secret key is entered. In an embodiment herein, the entity that generates the passphrase (for example, the manufacturer of the storage device 24) maintains the same secret key that is provided at the storage device 24. Just as with the secret key at the storage device 24, the secret key at the location where the passphrase is generated may be protected from unauthorized access/modification in some form using, for example, tamper-proof hardware, a vaulted computer, etc.

Following step 178 is a step 182 when the PIN is entered. In an embodiment herein, a user desiring access may choose his or her own PIN for each time the user accesses a storage device. In other embodiments, is possible to assign PIN values in an automatic fashion and then to report to the user the assigned PIN value. Following the step 182 is a step 184 where a passphrase is generated. Generating the passphrase at step 184 involves using the same (or similar) one-way encryption function used to test for the validity of the passphrase by the access test module 122. For example, in embodiments where a one-way hash function is used to test for the passphrase by the access test module 122, then the same one-way hash function may be used to generate the passphrase at step 184.

Note that it is possible to use a different function to generate the passphrase than is used to test the passphrase at the access test module. Note that it is also possible to use different keys for generation and testing. For example, using a public/private key pair, it is possible to generate the passphrase using a private key (by digitally signing the data of the passphrase, except the key, using the private key) and then verify the passphrase at the storage device using the corresponding public key. An advantage to this is that it does not require special storage requirements for the secret key at the storage device 24 since the storage device 24 may use a non-secret public key to verify the digital signature.

Following the step 184 is an optional step 186 where the passphrase is stored in a computer readable storage medium, such as a smart card, a floppy disk, a CD, a memory stick, or any other appropriate computer readable storage medium. Of course, since the passphrase is simply a set of numbers/symbols, it is always possible to simply report the passphrase to the user and have the user to type in the passphrase at the storage device 24 when the user is requesting access. However, if the step 186 is executed, then the user may have a copy of the passphrase stored on a computer readable storage medium that the user may then present to the storage device 24 when the user desires access. Note also that it is possible to store the passphrase on a computer readable storage medium at the step 186 and still require the user type in the passphrase at the storage device 24. In that case, the computer readable storage medium may simply be for the purpose of providing a permanent copy of the passphrase in case the user loses or forgets it. Following step 186, processing is complete. Note that, if the step 186 is not executed, then following the step 184 processing is complete.

It is possible to provide other embodiments of the system described herein that encode only a subset of the information that is illustrated herein as being encoded into the passphrase. For example, it is possible to omit the ID and/or to omit the access time and/or to omit the username, etc. In addition, it is also possible to add additional information to be encoded into the passphrase that is not mentioned in connection with the flowchart 170 in FIG. 7. Other possible additional information may be added to the passphrase. Examples are the types of additional information which may be added include location information, information indicating the nature of the service to be performed by the user, etc.

In another embodiment, the passphrase may include an access credential portion and a one-way encoded portion that together are encrypted as encrypted content, as described in detail elsewhere herein. For example, in accordance with a Triple Data Encryption Standard (DES) encryption algorithm, the passphrase may comprise 64 bits (or 16 hex characters) as part of a Short Lived Credential (SLC). The SLC may include the passphrase along with an additional eight bits of unencrypted data that may be added (total SLC of 72 bits), and which may be other information that, for example, defines the day and/or time on which the creation of the passphrase took place. The format of the 16 hex character passphrase may be UUUUVVRAHHHHHHHH, where:

UUUU is User ID;
VV is Validity duration;
R is Role;
A is Activity; and
HHHHHHHH is one-way encoded information (described in more detail below).

The first half of the passphrase may form the access credential information of the user. As noted above, the User ID may be the unique identifier of the user for which the SLC is granted (shown as a two-byte value, allowing up to 65536 different users). Validity duration is amount of time (e.g., number of days or hours) that the SLC is valid. The validity duration may be determined relative to the time the SLC is granted, which may be defined as the time at which the encryption key was generated. Role defines a value which is used as a reference to the privileges granted to the user. Activity describes the specific activity for which the SLC is granted. When concatenating all of the above fields, a 32 bit word (8 hex character) is generated. The lengths shown herein are for illustrative purposes only, and may be adjusted as appropriate (e.g., the user ID field may be expanded or made smaller). Also, other types of access credential information are possible and contemplated herein. For example, the access credential information may include a device ID associated with the device for which access is to be requested.

The second half of the 64 bit (16 hex character) string may be a keyed-hash message authentication code (HMAC) function of the first half or other portion of the access credential information. For example, HHHHHHHH=HMAC (T$_s$, UUUUVVRA) where T$_s$ is a unique token key, as further described elsewhere herein. Other types of one-way encoding functions may be used where, given the output of the function, it is mathematically difficult, if not impossible, to ascertain the input. In some embodiments, the PIN may be used in connection with the HMAC function.

Referring now to FIGS. 8A-8E, in which are shown schematic diagrams illustrating the components used in controlling access to a target system 290 according to the system described herein. As shown in FIG. 8A, a generator 200 may use a respective secret key or seed (S) 201 related to the target system 290 and which is available to the generator 200. Then, the generator 200 may generate a token key (T$_s$) 220 that may be relative to other information 210, for example the time and date (T/D) of the request (e.g., rounded up or down to the nearest hour). When creating the one-way encoded portion of the passphrase, the token key (T$_s$) 220 may be the key used by the HMAC function as a hash key. In other embodiments, only the seed may be used to generate the token key, in which case the time/date information may or may not be one-way encoded separately.

As shown in FIG. 8B, an encryption key (K) 230 that may be used for encrypting the passphrase may be generated using at least some of the same data used to generate the same token key (T$_s$) 220 noted above (the seed (S) 201 and time/date (T/D) information 210). Generation of the encryption key (K) may also include use of the user's password 212 (P or a hash thereof H(P)). Thus, K=T$_s \oplus$ H(P). The user's password 212 may be referred to herein as a PIN. An encryption key generated as above may help obfuscate the token key and thereby better protect the secret key/seed. By incorporating the PIN 212 into the encryption key (K) 230, instead of as part of the encrypted content of the SLC, size restrictions on the length of the PIN may be eliminated and security improved through use of a larger PIN.

As shown in FIG. 8C, a passphrase 250 is generated by one-way encoding (e.g., hashing) access credential information 240 using the token key (T$_s$) 220 to generate a one-way encoded portion of the passphrase, and combining the one-way encoded portion with the clear-text access credential information 240 to generate the passphrase 250. As shown in FIG. 8D, the passphrase (having the one-way encoded portion) 250 is then encrypted using the encryption key (K) 230 to generate an encrypted passphrase 260. In some embodiments, the PIN may also be used to generate the passphrase 250.

As shown in FIG. 8E, the encrypted passphrase 260 and/or the time/date (T/D) information 210 form SLC information 270 that may be supplied to the requester who presents the information 270 when requesting on-site access to the target system 290. The SLC 270 may be communicated to the user for manual entry by the user at an access validator 280 of the system 290 (e.g., typed in by the user) or provided by some other means, such as a floppy disk, a CD, a smart card, a memory stick device, or other storage medium that may be received and/or retrieved by the access validator 280.

At the target system 290, the access validator 280 requests or otherwise receives the SLC information 270 and the user's PIN 212 from the user who is requesting access. The validator 280 generates the token key (T$_s$) 220 from the secret key/seed (S) 201 stored in the target system 290 and the time/date (T/D) information 212 associated with the SLC 270 and derives the encryption key (K) 230 using the seed (S) 201, the time/date information (T/D) 210, and the PIN 212. The validator 280 then decrypts the encrypted passphrase 260 with the generated encryption key (K) 230, takes the first half (or other portion thereof) of the decrypted passphrase (corresponding to the access credential information) and uses the generated token key (T$_s$) 220 to apply the HMAC function to the access credential information.

The validator 280 compares the result of the HMAC function to the appropriate portion (e.g., second half) of the decrypted passphrase. Only if there is a match is the decryption successful. After the passphrase has been successfully matched, the access credentials are checked to ensure that the SLC is valid. For example, the validator 280 may determine if the SLC is valid based on whether the credentials indicate a still valid duration or whether the role and/or activity information of the access credential information are authorized for the particular requested access. Operations of the generator 200 and the validator 280 are more fully described elsewhere herein.

Figure 9:
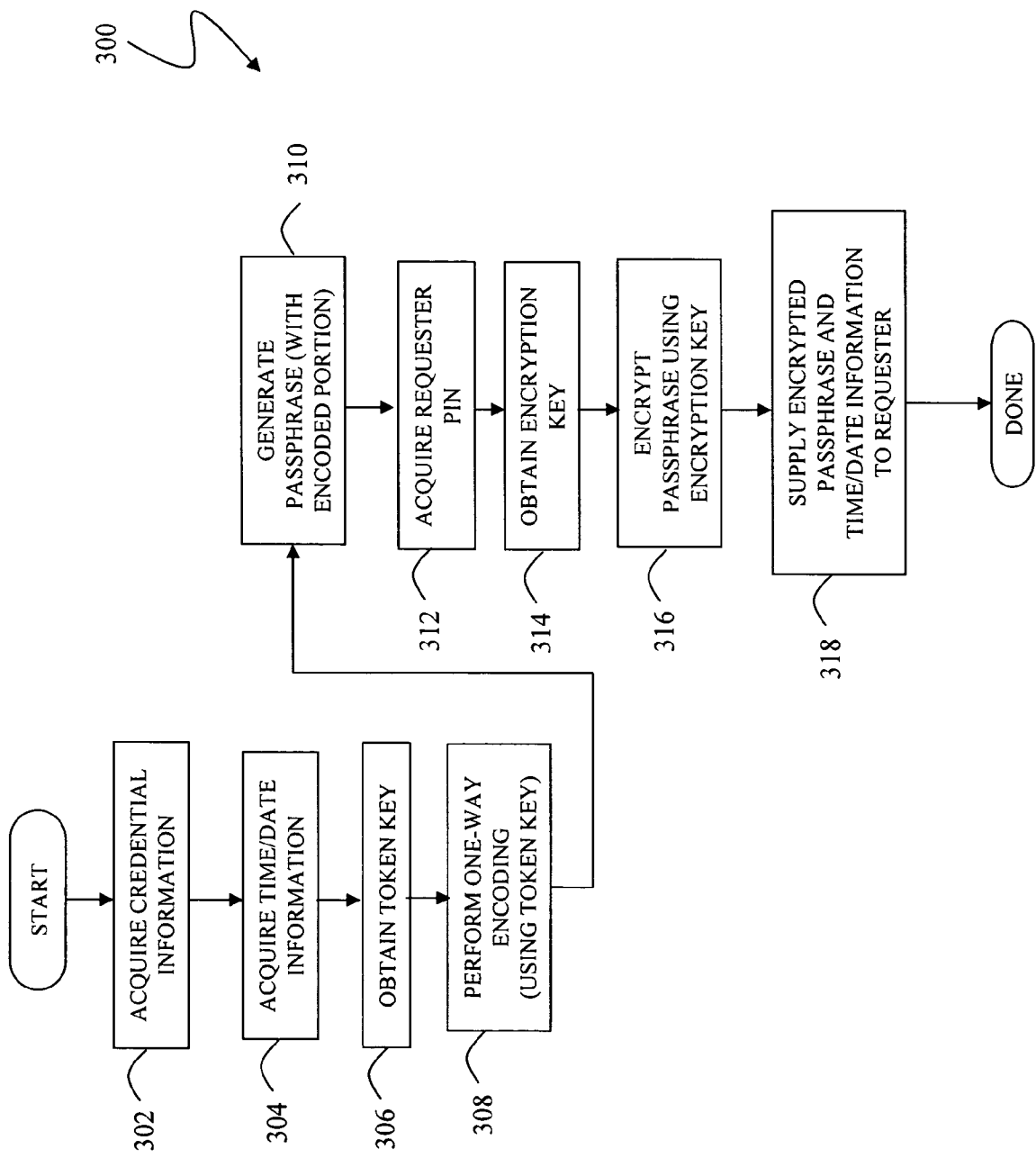
FIG. 9 is a flowchart illustrating steps performed in connection with the SLC generator encoding and encrypting a passphrase and supplying that information to a user who will be requesting on-site access at the target system according to the system described herein.

FIG. 9 is a flowchart 300 illustrating steps performed in connection with a SLC generator encoding and encrypting a passphrase and supplying SLC information to a user for requesting on-site access at a target system, according to the system described herein. Processing begins at a first step 302 where the generator acquires access credential information for the user. As described elsewhere herein, access credential information may include a user ID, validity duration, role and activity.

Following the step 302 is a step 304 where the generator acquires the time/date information in connection with the generation of SLC. Following the step 304 is a step 306 where the generator obtains a token key that may be generated using the acquired time/date information for the SLC generation and the secret key/seed that is available to the generator and that is related to the target system. It is also possible for the token key to be generated using an acquired PIN of the requester, as noted below.

Following the step 306 is a step 308 where the one-way encoding is performed, as discussed elsewhere herein. The one-way encoding may use the token generated at the step 306. Note that it is possible to one-way encode all of the access credential information, a portion of the access credential information, or a combination of either and with or without other information such as the date/time information, etc. Following the step 308 is a step 310 where a passphrase is generated. As discussed elsewhere herein, the passphrase may include an access credential portion and a one-way encoded portion that is encoded using the token key.

Following the step 310 is a step 312 where the generator acquires the PIN of the user who will be requesting access at the on-site target system. The PIN may be previously available to the generator or entry of the PIN may be required at the generator at the time of the creation of the SLC. Following the step 312 is a step 314 where the generator obtains an encryption key that may be generated using the acquired PIN, the acquired time/date information, and the secret key/seed related to the target system. Following the step 314 is a step 316 where the passphrase (having the one-way encoded portion) is encrypted using the encryption key. Note that it is possible to encrypt only a portion of the passphrase, for example only a portion of the access credentials. Note also that the portion of the access credentials that is encrypted may be the same or different from the portion of the access credentials that is one-way encoded. Following the step 316 is a step 318 where the encrypted passphrase and the time/date information are provided to the requester as a SLC. The SLC may be communicated to the requester for manual entry by the requester at an access validator target system (e.g., typed in by the user) or provided by some other means, such as a floppy disk, a CD, a smart card, a memory stick device, or other storage medium. After the step 318, processing is complete. Executable code, stored in a computer-readable medium, may be provided for carrying out the above-noted steps.

Figure 10:
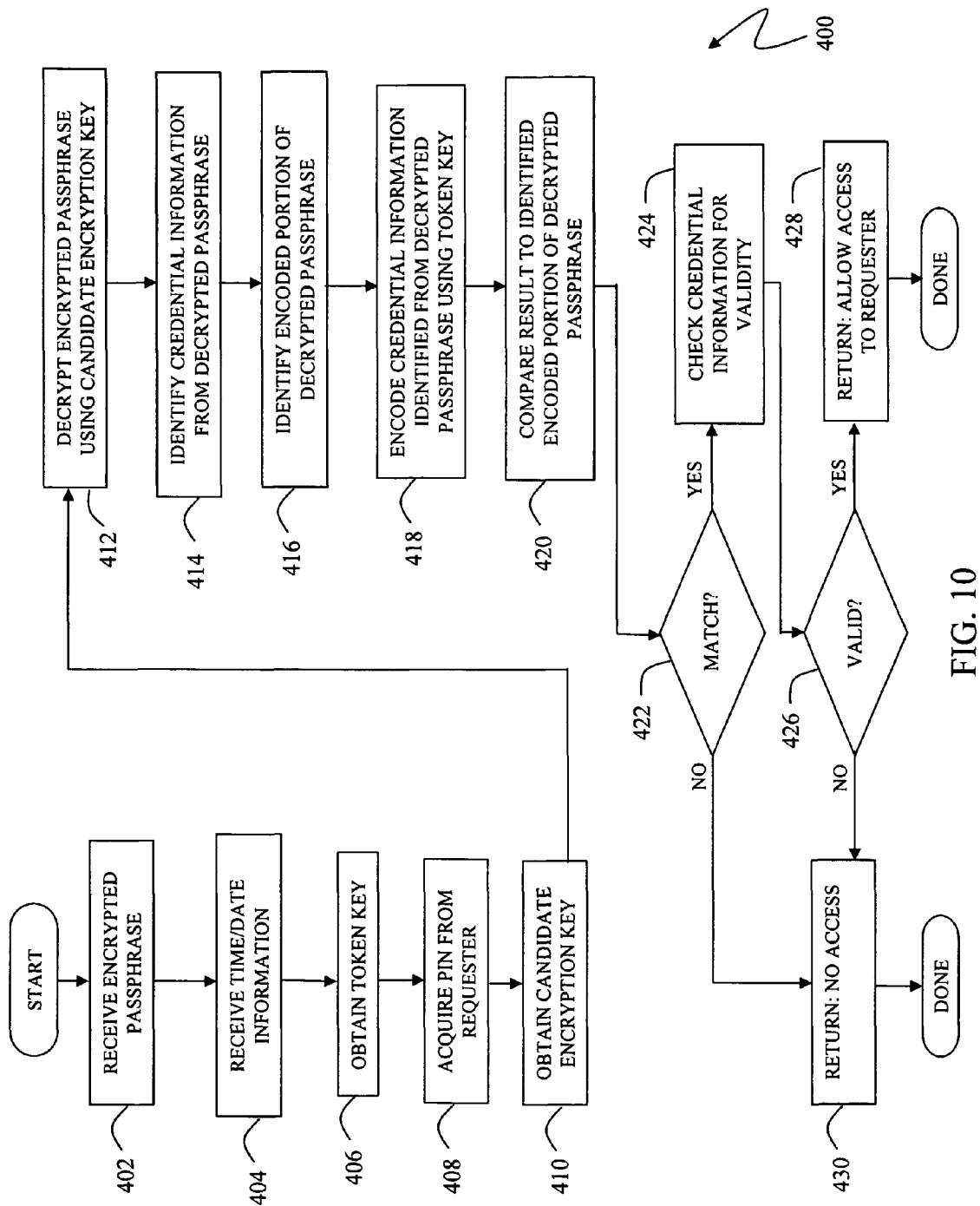
FIG. 10 is a flowchart illustrating steps performed in connection with the access validator on-site at the target system receiving and decrypting a passphrase and authorizing or denying access to the target system according to the system described herein.

FIG. 10 is a flowchart 400 illustrating steps performed in connection with an access validator at the target system receiving and decrypting a passphrase and authorizing or denying access to the target system, according to the system described herein. Processing begins at a first step 402 where the access validator receives the encrypted passphrase. Following the step 402 is a step 404 where the access validator receives the time/date information associated with the SLC. As noted elsewhere herein, the encrypted passphrase and time/date information may be provided manually by the requester or by information presented by the requester and retrieved by the access validator, such as a smartcard or other storage medium.

Following the step 404 is a step 406 where the access validator obtains a token key which may be generated using the received time/date information and the secret key/seed related to the target system and which is available to the access validator. Following the step 406 is a step 408 where the access validator acquires the requester's PIN, for example, by requesting the PIN on a display and receiving the PIN input by the requester. Following the step 408 is a step 410 where the access validator obtains a candidate encryption key that may be generated using the seed of the target system, the acquired time/date information and the received PIN from the requester.

Following the step 410 is a step 412 where the access validator uses the candidate encryption key to decrypt the encrypted passphrase. Following the step 412 is a step 414 where credential information is identified from the decrypted passphrase. Following the step 414 is a step 416 where an encoded portion of the decrypted passphrase is identified. Following the step 416 is a step 418 where the access validator one-way encodes the identified credential information using the obtained token key to yield a result. Following the step 418 is a step 420 where the access validator compares the result to the encoded portion that was identified from the decrypted passphrase.

Following the step 420 is a test step 422 where it is determined whether the result matches the encoded portion of the decrypted passphrase. If the result does not match, processing proceeds to a step 430 where no access is returned so that access is denied to the requester. On the other hand, if the result does match at the step 422, processing then proceeds to a step 424 at which the access validator checks the identified credential information for validity. For example, the validator may determine if credential information is valid based on whether the credentials indicate a still valid duration or whether the role and/or activity information of the access credential information are authorized for the particular requested access.

Following the step 424 is a test step 426 where it is determined whether credential information is valid. If the credential information is determined to be invalid at the step 426, then processing proceeds to the step 430, where access is denied to the requester. On the other hand, if the credential information is determined to be valid at the step 426, then processing proceeds to a step 428 which returns a result to allow access to the requester. Executable code, stored in a computer-readable medium, may be provided for carrying out the above-noted steps.

In accordance with the system described herein, hashing with Secure Hash Algorithm (SHA)-256 may be used for one-way encoding to create a 256 bit value. For the passphrase HMAC, SHA-256 based HMAC may be invoked for the 32 desired bits and a shortening algorithm used to reduce the HMAC field of the passphrase to 32 bits. For combining the PIN into the encryption key, a SHA-256 may be run on the PIN. For Triple DES encryption, the H(P) portion may be shortened to 168 bits, divided into three groups, and every 56 bit key XOR'd with a selected 56 bit key of the hash.

In another embodiment, the system described herein may also support an Advanced Encryption Standard (AES) encryption algorithm using 128 bit blocks. For example, the passphrase of the SLC may be 128 bits (due to AES block size) which translates into 32 hex characters. Accordingly, the access credential portion of the passphrase may stay the same, while the rest of the available bits may go into the HMAC portion, increasing the size of the one-way encoded portion to 96 bits. The format of the 32 hex characters may then be UUUUVVRAHHHHHHHHHHHHHHHHHHHHHHHH where:

UUUU is User ID;
VV is Validity duration;
R is Role;
A is Activity; and
HHHHHHHHHHHHHHHHHHHHHHHH is one-way encoded information (e.g., HMAC of UUUUVVRA).

Since the size of the HMAC would be 256 bits due to the use of SHA-256 for the hashing, a shortening algorithm may be used to reduce the HMAC portion of the passphrase to 96 bits. For combining the PIN into the encryption key, SHA-256 may be run on the PIN and, for AES, the result may be shortened to 128 bits. Note that 256 bit AES may also be used in a similar manner as noted above and which may yield simpler processing requirements when used in conjunction with SHA-256. Other encryption algorithms (e.g., 3DES), and corresponding passphrase configurations, may also be applicable to the system described herein. Thus, the specific algorithms described herein are examples only.

In an embodiment noted above, the token key (based on the seed of the target device and time/date information of the credentials) is used as the basis for: (1) the hash key used by the HMAC function to generate the one-way encoded portion of the passphrase (i.e., the portion of the passphrase that represents the HMAC of the user identification and access credentials) and (2) the encryption key to encrypt the passphrase and that is generated using the token key and a PIN (or hash thereof), as described elsewhere herein. Alternatively, in another embodiment, the HMAC hash key (to generate the one-way encoded portion of the passphrase) and/or the encryption key (to encrypt the passphrase) may be generated completely separately from each other and/or from the seed key. That is, two keys are independently generated and available to the validator of the target system instead of the hash key and encryption key being based on one common token key.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of restricting access to a target system, comprising:
receiving an encrypted passphrase, wherein the encrypted passphrase is resented by a user requesting access to the target system;
obtaining a secret key associated with the target system;

receiving unencrypted information associated with the encrypted passphrase;
receiving a user PIN;
generating a token key using the secret key associated with the target system and the unencrypted information associated with the encrypted passphrase;
generating an encryption key using the secret key, the user PIN, and the unencrypted information;
generating a decrypted passphrase from the encrypted passphrase using the encryption key to decrypt the encrypted passphrase, the decrypted passphrase including a first portion and a second portion, wherein the first portion of the decrypted passphrase is generated by one-way encoding at least a portion of access credentials of the user using the token key, wherein the second portion of the decrypted passphrase includes the portion of the access credentials;
one-way encoding the second portion of the decrypted passphrase using the token key to provide a one-way encoded portion of the decrypted passphrase;
comparing the one-way encoded portion of the decrypted passphrase with the first portion of the decrypted passphrase; and
denying access into the target system if the one-way encoded portion of the decrypted passphrase does not match the first portion of the decrypted passphrase.

2. The method according to claim 1, further comprising:
if the one-way encoded portion matches the first portion of the decrypted passphrase, determining validity of the second portion, wherein if the second portion is valid, access into the target system is allowed and wherein if the second portion is not valid, access into the target system is denied.

3. The method according to claim 1, wherein said unencrypted information includes time/date information indicative of date and time associated with the second portion.

4. The method according to claim 1, wherein said target system is a storage device.

5. The method according to claim 1, wherein the second portion of the decrypted passphrase includes at least one of: a username that identifies a user, a validity duration for which access is allowed, a role for the user, and an activity of the user.

6. The method according to claim 1, wherein receiving the encrypted passphrase includes retrieving the encrypted passphrase from at least one of: a smartcard, a memory stick, a floppy disk, and a CD.

7. The method according to claim 1, wherein one-way encoding includes using a hashing algorithm SHA-256, and wherein the encrypted passphrase is at least one of Triple DES encrypted and AES encrypted.

8. A non-transitory computer readable medium having computer executable instructions for restricting access to a target system, the instructions comprising executable code for:
receiving an encrypted passphrase, wherein the encrypted passphrase is presented by a user requesting access to the target system;
obtaining a secret key associated with the target system;
receiving unencrypted information associated with the encrypted passphrase;
receiving a user PIN;
generating a token key using the secret key associated with the target system and the unencrypted information associated with the encrypted passphrase;
generating an encryption key using the secret key, the user PIN, and the unencrypted information;
generating a decrypted passphrase from the encrypted passphrase using the encryption key to decrypt the encrypted passphrase, the decrypted passphrase including a first portion and a second portion, wherein the first portion of the decrypted passphrase is generated by one-way encoding at least a portion of access credentials of the user using the token key, wherein the second portion of the decrypted passphrase includes the portion of the access credentials;
one-way encoding the second portion of the decrypted passphrase using the token key to provide a one-way encoded portion of the decrypted passphrase;
comparing the one-way encoded portion of the decrypted passphrase with the first portion of the decrypted passphrase; and
denying access into the target system if the one-way encoded portion of the decrypted passphrase does not match the first portion of the decrypted passphrase.

9. The non-transitory computer readable medium according to claim 8, wherein said unencrypted information includes time/date information indicative of date and time associated with second portion.

10. The non-transitory computer readable medium according to claim 8, wherein said target system is a storage device.

11. The non-transitory computer readable medium according to claim 8, wherein the second portion of the decrypted passphrase includes at least one of: a username that identifies a user, a validity duration for which access is allowed, a role for the user, and an activity of the user.

12. The non-transitory computer readable medium according to claim 8, wherein the encrypted passphrase is received from at least one of: a smartcard, a memory stick, a floppy disk, and a CD.

13. The non-transitory computer readable medium according to claim 8, wherein one-way encoding includes using a hashing algorithm SHA-256, and wherein the encrypted passphrase is at least one of Triple DES encrypted and AES encrypted.

14. The non-transitory computer readable medium according to claim 8, wherein, if the one-way encoded portion matches the first portion of the decrypted passphrase, determining validity of the second portion, wherein if the second portion is valid, access into the target system is allowed and wherein if the second portion is not valid, access into the target system is denied.

15. A device including at least one processor that restricts access to a target system, the at least one processing performing steps comprising:
receiving an encrypted passphrase, wherein the encrypted passphrase is presented by a user requesting access to the target system;
obtaining a secret key associated with the target system;
receiving unencrypted information associated with the encrypted passphrase;
receiving a user PIN;
generating a token key using the secret key associated with the target system and the unencrypted information associated with the encrypted passphrase;
generating an encryption key using the secret key, the user FIN, and the unencrypted information;
generating a decrypted passphrase from the encrypted passphrase using the encryption key to decrypt the encrypted passphrase, the decrypted passphrase including a first portion and a second portion, wherein the first portion of the decrypted passphrase is generated by one-way encoding at least a portion of access credentials of the user using the token key, wherein the second portion of the decrypted passphrase includes the portion of the access credentials;

one-way encoding the second portion of the decrypted passphrase using the token key to provide a one-way encoded portion of the decrypted passphrase;

comparing the one-way encoded portion of the decrypted passphrase with the first portion of the decrypted passphrase; and denying access into the target system if the one-way encoded portion of the decrypted passphrase does not match the first portion of the decrypted passphrase.

16. The device according to claim 15, wherein said unencrypted information includes time/date information indicative of date and time associated with second portion.

17. The device according to claim 15, wherein said target system is a storage device.

18. The device according to claim 15, wherein the second portion of the decrypted passphrase includes at least one of: a username that identifies a user, a validity duration for which access is allowed, a role for the user, and an activity of the user.

19. The device according to claim 15, wherein the encrypted passphrase is received from at least one of: a smartcard, a memory stick, a floppy disk, and a CD.

20. The device according to claim 15, wherein one-way encoding includes using a hashing algorithm SHA-256, and wherein the encrypted passphrase is at least one of Triple DES encrypted and AES encrypted.

21. The device according to claim 15, wherein, if the one-way encoded portion matches the first portion of the decrypted passphrase, determining validity of the second portion, wherein if the second portion is valid, access into the target system is allowed and wherein if the second portion is not valid, access into the target system is denied.

22. A system for restricting access to a target system, comprising:

a generator that obtains access credentials for a user, generates a passphrase including a first portion and a second portion, wherein the first portion of the passphrase is generated by one-way encoding at least a portion of the access credentials using a token key to generate a one-way encoded portion of the passphrase, wherein the second portion of the passphrase includes the portion of the access credentials, and wherein the token key is generated using a secret key associated with the target system and an unencrypted information associated with the passphrase and generates an encrypted passphrase by encrypting the passphrase including the first portion and the second portion using an encryption key, wherein the encryption key is generated using the secret key, a user PIN received from the user, and the unencrypted information; and a validator that decrypts the encrypted passphrase using the encryption key to yield a decrypted passphrase, the encrypted passphrase being presented by the user requesting access to the target system, determines the second portion of the decrypted passphrase corresponding to the portion of the access credentials and determines the first portion of the decrypted passphrase corresponding to the one-way encoded portion, one-way encodes the second portion of the decrypted passphrase using the token key to generate a result, compares the result to the first portion of the decrypted passphrase, and denies access to the target system if the result does not match the first portion of the decrypted passphrase.

23. The system according to claim 22, wherein, if the result and the one-way encoded portion match, the validator determines a validity of the portion of the access credentials, wherein if the portion of the access credentials is valid, the validator allows access into the target system, and wherein if the portion of the access credentials is not valid, the validator denies access into the target system.

24. The system according to claim 22, wherein said unencrypted information includes time/date information indicative of date and time associated with second portion.

25. The system according to claim 22, wherein said target system is a storage device.

26. The system according to claim 22, wherein the second portion of the decrypted passphrase includes at least one of: a username that identifies a user, a validity duration for which access is allowed, a role for the user, and an activity of the user.

27. The system according to claim 22, wherein the encrypted passphrase is received from at least one of: a smartcard, a memory stick, a floppy disk, and a CD.

28. The system according to claim 22, wherein one-way encoding includes using a hashing algorithm SHA-256, and wherein the encrypted passphrase is at least one of Triple DES encrypted and AES encrypted.

* * * * *